INVENTORS
MORTIMER LEVY
ARNOLD L. PUNDSACK
BY Owen D Marjama
James J. Ralabate
ATTORNEYS Jan. 19, 1971 M. LEVY ET AL 3,556,781

MIGRATION IMAGING PROCESS

Filed Oct. 27, 1967 2 Sheets-Sheet 2

INVENTORS
MORTIMER LEVY
ARNOLD L. PUNDSACK
BY
ATTORNEYS

United States Patent Office 3,556,781
Patented Jan. 19, 1971

3,556,781

MIGRATION IMAGING PROCESS

Mortimer Levy and Arnold L. Pundsack, Rochester, N.Y., assignors to Xerox Corporation, Rochester, N.Y., a corporation of New York Filed Oct. 27, 1967, Ser. No. 678,678
Int. Cl. G03g 13/22
U.S. Cl. 96—1 9 Claims

ABSTRACT OF THE DISCLOSURE

A method of imaging which comprises providing an imaging structure having a support, and an overlayer of softenable material containing a particulate photosensitive overlayer, selectively imaging a desired portion of said structure by forming a latent image on said portion, developing said latent image by uniform exposure to a developing agent, whereby an nmage is formed by the selective migration of photosensitive particles in image configuration, and selectively forming at least one additional latent image on said imaging structure, and developing said latent image by uniform exposure to a developing agent, whereby an additional image is formed by the selective migration of photosensitive particles in image configuration.

BACKGROUND OF THE INVENTION

This invention relates in general to imaging, and more specifically, to an improved imaging system.

There has recently been developed a migration imaging system capable of producing high quality images of high density, continuous tone, and high resolution. The system is described and claimed in copending application Ser. No. 403,002, filed on Oct. 12, 1964, and now abandoned. In a typical embodiment of this imaging system, an imaging structure comprising a conducting substrate with a layer or softenable or soluble material, containing photosensitive particles overlaying the conducting substrate is imaged in the following manner: A latent image is formed on the photosensitive surface, e.g., by uniform electrostatic charging, and exposure to a pattern of activating electromagnetic radiation. The softenable layer is then developed by exposing the plate to a solvent which dissolves only the softenable layer. The photosensitive particles which have been exposed to radiation migrate through the softenable layer as it is softened, and dissolved, leaving an image of photosensitive particles on the conducting substrate conforming to a negative of the original. This is known as a positive to negative image. Through the use of various techniques, either positive to positive or positive to negative images may be made depending on the materials used and the charging polarities. Those portions of the photosensitive layer which do not migrate to the conducting substrate may be washed away by the solvent with the softenable layer.

The migration imaging process comprises a combination of process steps which include charging, exposing, and developing with a solvent. The characteristics of these images are dependent upon such process steps as potential, exposure and development, as well as the particular combination of the process steps. High density, continuous tone, and high resolution are some of the photographic characteristics possible. This image is characterized as a fixed or unfixed photoconductive powder image which can be used in a number of applications, such as microfilm, hard copy, optical masks, and stripout applications using adhesive materials. Alternative embodiments of the concept are further described in the above cited copending application.

In a related imaging system described in copending

U.S. patent application 483,675, filed Aug. 30, 1965, nonphotosensitive particulate material is used to form images in the migration imaging mode defined above. In this system, a developable image is formed by charging in image configuration through the use of a mask or stencil. This image is then developed in a solvent for the softenable material.

Another recently developed imaging system comprises using the structure defined above, wherein the image is formed by development with heat, resulting in a surface disruption effect with substantially no particle migration of the photosensitive material within the softenable layer. This final image differs from the migration described above, in that the softenable layer is deformed in conjunction with the disruption of the photosensitive particles. This system is described and claimed in copending application Ser. No. 520,423 filed on Jan. 13, 1966, and now abandoned.

Another related imaging system comprises exposing a migration imaging structure, such as that defined above, to a solvent vapor to form a migration image. The image of photosensitive particles is then heated whereby an image having low background is produced. This system is described and claimed in copending application Ser. No. 612,122, filed on Jan. 27, 1967. If desired, the migration image formed above may be utilized as a separate image without resorting to the heating step.

In copending application Ser. No. 590,960, filed on Oct. 31, 1966, the above imaging systems and structures are defined as being used in an imaging system in which selective frames or portions of a developable migration imaging structure may be charged, exposed, and developed to form a separate image, while leaving unaffected the remaining portion of the migration imaging structure. Up to this time, when desiring to form or develop an image on a given migration imaging film or plate, it is required that the entire surface or sheet be expended in the developing process no matter how large or what size image is being produced. However, in application Ser. No. 590,960, the desired frame or frames of the migration imaging film are uniformly or selectively electrostatic charged to form an image, and the desired frame developed by exposure in a vapor cup on a liquid tank or by a liquid tank being brought into position over the selected frame. The material may be developed by either a liquid solvent or vapor, or by heat, but in all cases it is required only to develop or activate the selected frame area.

In copending application Ser. No. 612,122, a usable image is formed without resorting to dissolving, melting, or stripping away the thermoplastic layer. This process results in a self-fixed image comprising photosensitive particles in image configuration formed in depth within the softenable layer. Through the use of this imaging system, it can be seen that there are definite process advantages in forming selective images on a given film having an array of frames, without the need for resorting to selective masking members which must heretofore have been used in the developing step.

SUMMARY OF THE INVENTION

It is, therefore, an object of this invention to provide an imaging system in which selective formation and uniform development of a migration image may be accomplished.

It is another object of this invention to provide an improved imaging system directed to selectively forming images contained on a sheet having a plurality of image frames.

It is a further object of this invention to provide an improved imaging system.

The foregoing objects and others are accomplished in accordance with this invention by providing an imaging system, such as that disclosed in the above mentioned copending application Ser. No. 612,122, in which a migration image of photosensitive particles in image configuration is formed as follows: A structure comprising a substrate overcoated with a layer of softenable or soluble material containing a layer of photosensitive particles is imaged by forming a latent image on the photosensitive surface such as by uniform electrostatic charging under dark room conditions. The plate or film is then exposed to a pattern of activating electromagnetic radiation. The softenable layer is then uniformly developed or exposed for a few seconds in a solvent vapor while still being maintained under dark room conditions, so as to cause a selective migration of the photosensitive particles in the areas exposed to radiation, down to or near the conductive substrate. Alternatively, the migration image may be formed by heat alone. This invention is specifically directed to the selective addition of images to a film or sheet after the formation of an original image, or to an already developed image. The unexposed regions of the film are not appreciably effected by an additional migration imaging cycle. Even after a short wait following development, the film may again be charged in the dark and exposed to a new image, and vapor developed to produce a composite of the two exposures, or if desired, a separate image may be formed in another area which has not ben exposed to light. These images can be superimposed within a previously formed image or formed adjacently, such as on a microfiche card. This concept distinguishes over that set forth in the above copending application Serial No. 590,960 in that the requirement for a mask or cup during the vapor development step is obviated, inasmuch as the softenable plastic material in this invention is not dissolved or washed away. This, of course, allows for the remainder or entire migration imaging film to remain substantially intact throughout the entire developing process, and still allow for additional images to be added to unexposed or undeveloped areas. Other methods of forming a migration image such as by developing by heat alone are also included within the scope of this invention.

Optionally, the vapor developed structure may be heated for a few seconds causing the photosensitive particles in the areas unexposed to radiation to agglomerate or flocculate, often accompanied by the fusion of the photoconductive particles, resulting in a very low background-high density image. If the migration image is formed by heating, the reduction in background may be accomplished by following the migration heating step by exposure to solvent vapors followed by a second heating step which results in a reduction in background.

It should be pointed out that the optional heating step to reduce background should only be carried out after completion of the formation of the migration image or images in a given area. This precaution should be taken inasmuch as the heating of a vapor developed area will result in a fusion or agglomeration of the photoconductive particles, and render the heated area, if not already imaged, unsuitable for further imaging. The heating, of course, may be restricted to the immediate area of image development in order to allow for further use of the unimaged areas.

As mentioned above, the developed images in this case differ from those defined above, which are formed by a liquid solvent development, in that in this process the softenable layer remains substantially intact after development. This image is also distinguishable over that defined in copending application Ser. No. 520,423, in which the image is formed by surface disruption, in that here the image is formed by the selective migration of photosensitive particles from the surface toward the conductive substrate.

BRIEF DESCRIPTION OF THE DRAWINGS

The advantages of this improved system will become apparent upon consideration of the following disclosure of the invention; especially taken in conjunction with the accompanying drawings wherein:

Referring to FIG. 1A, there is shown a schematic drawing of an example of one embodiment of this invention comprising an imaging plate 10 having a substrate 11, overcoated with a softenable material 12 which contains at its upper surface a particulate layer of photosensitive material 13.

Figure 1A:
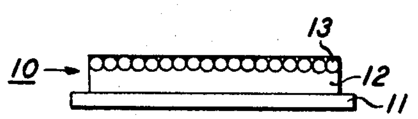
FIG. 1A shows an imaging plate.

The substrate 11 may comprise any suitable electrical conductor. Typical substrates are copper, brass, aluminum, steel, cadmium, silver and gold. The substrate may be in any form such as a metallic strip, sheet, coil, cylinder, drum or the like. If desired, the conductive substrate may be coated on an insulator such as paper, glass or a plastic. One example of this type of substrate comprises NESA glass, which is a partially transparent tin oxide coated glass available from Pittsburgh Plate Glass Co. Another typical substrate comprises aluminized Mylar which is made up of a Mylar polyester film of the E. I. du Pont de Nemours & Co., Inc., having a thin semi-transparent aluminum coating. Another typical substrate comprises Mylar coated with copper iodide.

Alternatively, insulating or non-conductive substrates may also be used. When insulating substrates are used other methods known in the art of xerography for charging xerographic plates having insulating backings may be applied. For example, the plate of FIG. 1A may be moved between two corona charging devices and raised to opposite potentials to cause the desired charging to be effected. The applied electric field for the structures of this invention range from a few volts per micron to several hundred volts per micron of softenable plastic layer 12.

The softenable plastic layer 12 may be any suitable material which is softened in a vapor solvent, or heat, and in addition, is substantially electrically insulating during the imaging and developing cycle. Classes of materials falling within this definition include polystyrenes, alkyd substituted polystyrenes, polyolefins, styrene-acrylate copolymers, styrene-olefin copolymers, silicone resins, phenolic resins, and organic amorphous glasses. Typical materials are Staybelite Ester 10, a partially hydrogenated rosin ester, Foral Ester, a hydrogenated rosin triester, and Neolyne 23, an alkyd resin, all from Hercules Powder Co., SR 82, SR 84, silicone resins, both obtained from General Electric Corporation; Sucrose Benzoate, Eastman Chemical; Velsicol X–37, a polystyrene-olefin copolymer from Velsicol Chemical Corp.; Hydrogenated Piccopale 100, a highly branched polyolefin, HP–100, hydrogenated Piccopale 100, Piccotex 100, a copolymer of methyl styrene and vinyl toluene, Piccolastic A–75, 100 and 125, all polystyrenes, Piccodiene 2215, a polystyrene-olefin copolymer, all from Pennsylvania Industrial Chemical Co., Araldite 6060 and 6071, epoxy resins of Ciba; Amoco 18, a poly alpha-methylstyrene from Amoco Chem. Corp.; ET–693, and Amberol ST, phenol-formaldehyde resins, ethyl cellulose, and Dow C4, a methylphenylsilicone, all from Dow Chemical; M–140, a custom synthesized styrene-co-n-butylmethacrylate, R5061A, a phenylmethyl silicone resin, from Dow Corning; Epon 1001, a bisphenol A-epichlohydrin epoxy resin, from Shell Chemical Corp.; and PS–2, PS–3, both polystyrenes, and ET–693, a phenol-formaldehyde resin, from Dow Chemical; and a custom synthesized 80/20 mole percent copolymer of styrene and hexylmethacrylate having an intrinsic viscosity of 0.179 dl./gm.

In general, the softenable or soluble layer should be from about ½ to 16 microns in thickness, and may be prepared by any suitable technique. Typical methods of preparation include dip coating, roll coating, draw coating, or pour coating; with better control and more uniform results being obtained with dip and roll coating techniques. Thicknesses below ½ micron do not allow a sufficient depth for particle migration imaging. Thicker layers generally requiring a greater potential for charging, and in general, a thickness from about 1 to 5 microns has been found to yield particularly good results.

The above group of materials is not intended to be limiting, but merely illustrative of materials suitable for the softenable plastic layer.

The material comprising layer 13 may consist of any suitable inorganic or organic photosensitive material. Typical inorganic materials are vitreous selenium, vitreous selenium alloyed with arsenic, tellurium, antimony or bismuth, etc.; cadmium sulfide, zinc oxide, cadmium sulfoselenide, and many others. U.S. Pat. 3,121,006 to Middleton et al. sets forth a whole host of typical inorganic pigments. Typical organic materials are: Watchung Red B, a barium salt of 1-(4′-methyl-5′-chloro-azobenzene-2′-sulfonic acid)-2-hydrohydroxy-3-napthoic acid, C.I. No. 15865, available from Du Pont; Indofast double scarlet toner, a Pyranthrone-type pigment available from Harmon Colors; quindo magenta RV–6803, a quinacridones, such as Monastral Red B (E. I. Du Pont), Cyan Blue, GTNF the beta form of copper phthalocyanine, C.I. No. 74160, available from Collway Colors; Monolite Fast Blue GS, the alpha form of metal-free phthalocyanine, C.I. No. 74100, available from Arnold Hoffman Co.; Diane Blue, 3,3-methoxy-4,4′-diphenyl-bis(1″ azo-2″ hydroxy-3″-naphthanilide), C.I. No. 21180, available from Harmon Colors; and Algol G.C., polyvinyl carbazole 1,2,5,6-di (D,D′-diphenyl)-thiazole-anthraquinone, C.I. No. 67300, available from General Dyestuffs. The above list of organic and inorganic photosensitive materials is illustrative of some of the typical materials, and should not be taken as a complete listing.

The photosensitive particles of layer 13, may be formed by any suitable method. Typical methods include vacuum evaporation; cascading the material while being carried on glass beads or other suitable carrier over the soluble layer 12 which has been softened by a solvent vapor and/or heat; liquid development techniques; powder cloud development techniques; by slurry coating techniques; or by simply dusting the particles of photosensitive material over the slightly softened soluble material.

In addition to the configuration shown in FIG. 1A additional modifications in the layered structure are also included within the scope of this invention. One such modification includes an overcoated layered structure in which a layer of photosensitive particles is sandwiched between two or more layers of the softenable material which overlay the conductive substrate.

The thickness of the particulate layer and size of the photoconductive particles is usually less than about one micron, with the particle size ranging from about 0.01 to 2.0 microns. Particles, larger than about 2.0 microns, do not yield optimum resolution and also show a reduction in image density compared to images having particles less than about 2.0 microns.

Figure 1B:
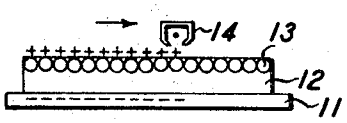
FIG. 1B shows electrostatic charging of the plate of FIG. 1A.
Figure 1C:
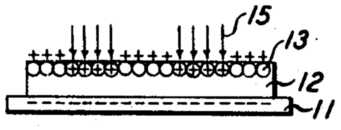
FIG. 1C shows the exposure of the plate of FIG. 1A to activating radiation in pattern configuration.
Figure 1D:
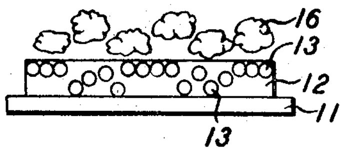
FIG. 1D shows the plate of FIG. 1A during the development of the image.

The structure or plate 10 of FIG. 1A may be imaged by uniformly electrostatically charging the surface with a corona charging unit 14 such as illustrated in FIG. 1B. The charged plate is then exposed to a pattern of activating radiation 15 as shown in FIG. 1C. The plate is then developed in vapor solvent 16, which then softens soluble layer 12 resulting in the formation of a migration image composed of photosensitive particles dispersed in image configuration within the softenable layer as illustrated by FIG. 1D.

Figure 2:
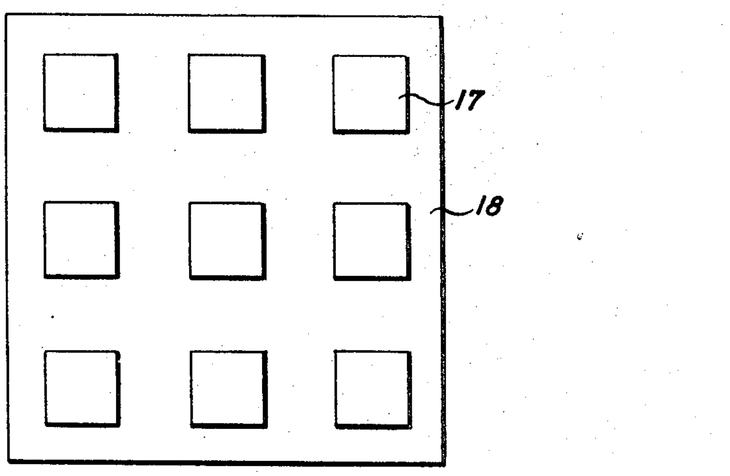
FIG. 2 shows a grouping of imaging frames on a supporting substrate.

The migration imaging structure such as that shown in the above figures may be deposited in frame configuration 17 onto a substrate 18 as shown in FIG. 2. Substrate 18 may be any material which is substantially insoluble in developer 16, and also substantially electrically insulating. Typical materials include glass, plastics, etc. Alternatively, support 18 may comprise a conductive substrate such as 11, shown and described in FIG. 1A. In this case, only the photosensitive and softenable plastic portions 12 and 13 of the plate will comprise frame 17 as substrate 18 will function as a conductive support 11.

In a further embodiment, the entire structure of FIG. 2 may be overcoated with the softenable plastic and photosensitive particles. This structure would be the same as plate 10 shown in FIG. 1, except be much larger, and allow for a total area to include a plurality of image areas or plates 10.

Figure 3A:
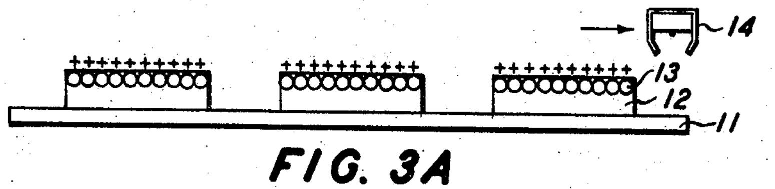
FIG. 3A shows charging a series of imaging frames contained on a supporting substrate.
Figure 3B:
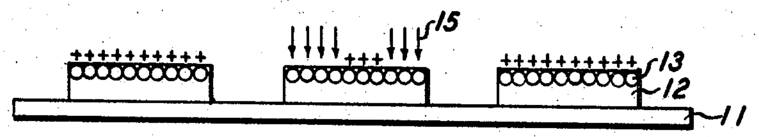
FIG. 3B shows imaging a selected frame of FIG. 3A.

In another embodiment of this invention, a sheet or film such as illustrated in FIG. 2 is imaged and developed in the following manner: As shown in FIG. 3A, a film containing three imaging frames for purposes of illustration, is uniformly electrostatically charged with a corona charging head 14, and charged a positive polarity. The desired frame is then imaged by exposing to selectively activating radiation 15 as shown in FIG. 3B. It should be noted that only the desired frame is exposed to activating radiation.

Figure 3C:
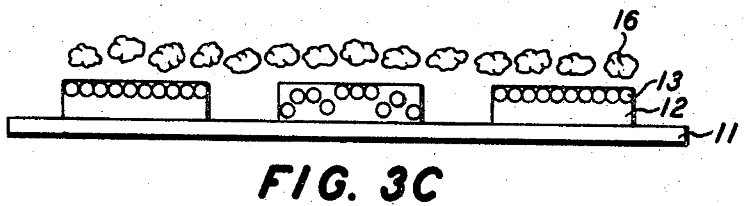
FIG. 3C shows uniformly exposing the film of FIG. 3B to solvent vapors.

Following exposure to activating radiation, the entire imaging structure including the light exposed plate is then developed by uniformly exposing to a solvent vapor 16, as shown in FIG. 3C. The exposure to the solvent vapor is usually for a short time such as from about one second or less up to as long as 30 seconds or more. When exposed to the vapor, the photoconductive particles which have been previously exposed to activating radiation migrate through the softenable layer as it is softened by the vapor, and migrate toward the conductive substrate in image configuration as shown in FIG. 3C. The areas of the photoconductive layer which have not been exposed to radiation do not migrate, and remain substantially intact in the softenable layer 12. During the initial stages of the vapor development step (less than 1 sec.) the electrical fields on all areas of the structure are substantially dissipated, as illustrated by a comparison of FIGS. 3B and 3C of the drawing. At the end of this sequence an image is formed which comprises migrated photoconductive particles in image configuration dispersed in depth toward the substrate, while the photoconductive particles which have not migrated remain substantially intact within the sotfenable layer 12. This image when viewed in a conventional slide projector shows high resolution and contrast density. In general, a few seconds of expose to the solvent vapor is sufficient to soften the plastic matrix. Any suitable solvent may be used to develop the plate. Typical solvents are Freon TMC, available from Du Pont; trichloroethylene, chloroform, ethyl ether, xylene, dioxane, benzene, toluene, cyclohexane, 1,1,1-trichloroethane, pentane, n-heptane, Odorless Solvent 3440 (Sohio), Freon 113, available from Du Pont; m-xylene, carbon tetrachloride, thiophene, diphenyl ether, p-cymene, cis-2,2-dichloroethylene, nitromethane, N,N-dimethyl formide, ethanol, ethyl acetate, methyl ethyl ketone, ethylene dichloride, methylene chloride, 1,1-dichloroethylene, trans 1,2-dichloroethylene, and super naptholite (Buffalo Solvents and Chemicals).

In exposing to the solvent vapor, a sample of the film or imaging plate may be simply held between a pair of tweezers and placed for a few seconds in the vapors contained above a small amount of liquid solvent or developer contained in a bottle. If greater control is desired, a graduated cylinder such as a 2 inch diameter 1,000 cc. graduate is used, and partially filled with liquid developer. The sample to be developed is then suspended for a few seconds at a predetermined point, such as the 500 cc. mark, while the graduate contains about 200 cc's. of liquid developer. By using the above technique, images having a consistently high quality can be easily prepared. If desired, the vapor can also be brought to the imaging plate through the use of fans, blowers, or the like, in order that a constant vapor pressure can be maintained.

Following the above imaging sequence, a second image may be formed adjacent the imaged frame on either or both of the unimaged frames of FIGS. 3A–3C, or by superimposing a second image over or within the imaged frame. This is accomplished by simply repeating the steps illustrated in FIGS. 3A–3C. If the image sheet or structure is constructed according to plate 10 of FIG. 1A without separately defined imaging frames, it is necessary only to maintain accurate registration of the plate during the imaging exposure step illustrated in FIG. 3B.

In another embodiment of this invention, instead of exposing to a single vapor, a combination of two separate vapor treatments may be performed. For example, an initial treatment in vapors of Freon 113 for several seconds results in the formation of a migration image. This is followed by a second vapor treatment in 1,1,1-trichloroethane for several seconds, and provides an effective way of development which allows for the use of a lower initial charging potential. The use of 1,1,1-trichloroethane vapor alone, requires a charging potential in the neighborhood of about at least 100 volts positive potential, while the double treatment with Freon 113 and 1,1,1-trichloroethane allows initial charging voltage to be reduced to about 75 volts. If desired, mixtures of various developers may also be used. For example, the vapors of a liquid mixture of up to 50% by volume of Freon 113 and methylene chloride provides a satisfactory developer.

The application of the optional heating step for reducing the background, which follows the vapor development, results in the selective flocculation or agglomeration and possible fusion of the photoconductive particles in the unmigrated areas which have not been struck by activating radiation. The heating must be sufficient to allow for the softening of the plastic material 12 to a degree which will allow the photoconductive material to flocculate or agglomerate and fuse. Any temperature which will result in this effect is suitable. Typical temperatures for the softenable plastic materials mentioned above are from about 60 to 130° C., but temperatures outside this range may be used depending upon the materials employed in the plate structure. The temperature and supporting substrate should be selected so as to prevent warping or buckling of the substrate during heating. The time for heating is not particularly critical. Generally about 1 to 10 seconds are usually sufficient to cause flocculation. The heating may be carried out by any convenient means such as a heating coil hot plate, forced hot air, etc.

The heating temperature and time necessary to form the migration image are substantially the same as those for the optional final heating step already described.

In another embodiment of this invention the photoconductive material 13 may be replaced with a non-photoconductive material. This material is also in particulate form (usually submicron in size) and may be electrically conductive or insulating. Typical materials are carbon black, garnet, iron oxide and insoluble dyes.

With the exception of utilizing a non-photoconductive material, and charging through mask or stencil, or using a shaped electrode, etc.; the method and materials are essentially the same as those shown and described with respect to the use of the photoconductive materials described above.

DESCRIPTION OF THE PREFERRED EMBODIMENTS

The following examples specifically define the present invention with respect to the method of selectively developing an image on a sheet which is adapted to contain a plurality of image frames. The parts and percentages in the disclosure, example, and claimed are by weight unless otherwise indicated. The examples below are intended to illustrate the various preferred embodiment of selectively preparing and developing migration images.

EXAMPLE I

An array of 9 imaging frames such as those illustrated in FIG. 2, are made by first preparing a mixture of 5% by weight of Staybelite Ester 10 (a 50% hydrogenated glycerol rosin ester of the Hercules Powder Co.), dissolved a solution of 20% cyclohexanone and 75% toluene. This mixture is sprayed at a nozzle pressure of about 50 p.s.i. onto a masked substrate of aluminized Mylar (a Mylar polyester film of the E. I. du Pont de Nemours & Co., Inc.) having a thin semi-transparent aluminum coating. The Mylar is sprayed so as to form a 2 micron layer of Staybelite when the coating is dried for 12 hours at room temperature. The aluminized Mylar sheet is about 12 x 12 inches in size and overlayed with a thin stainless steel mask, having 9 square openings ½" on a side, prior to the spray coating step. Following the coating step the mask is kept in place over the array of imaging frames.

A submicron layer of selenium is then deposited onto the Staybelite by vacuum evaporation using the process set forth in copending patent application Ser. No. 423,167, filed on Jan. 4, 1965, and now abandoned. Following the formation of the selenium layer, the stainless steel mask is stripped away from the substrate, leaving an array of imaging frames uniformly disposed on the Mylar substrate.

EXAMPLE II

A selected frame contained on the structure of Example I is imaged as follows: The entire sheet is registered below a corona charging device, such as that described by Carlson in U.S. Pat. 2,588,699, and uniformly charged to a positive potential of about 70 volts. An original copy to be reproduced is registered above the desired frame to be imaged and the selected frame exposed to an optical image with the energy in the illuminated areas of about 5 foot-candle-seconds, by means of a tungsten lamp. The frame is then developed by exposing the entire sheet to vapors of cyclohexane for about two seconds. An excellent image corresponding to the projected image is observed on the frame.

EXAMPLE III

Using the same imaging sheet of Example I, a second image is formed on an unimaged frame adjacent to the imaged frame by the method of Example II. An excellent image corresponding to the projected image is formed by this method. The imaging sheet at this point contains 2 imaged frames, with 7 imaging frames ready at any time for subsequent use.

EXAMPLE IV

An array of 9 imaging frames is prepared using zinc oxide as the photoconductor. An aluminized Mylar sheet is masked in the manner set forth in Example I.

A zinc oxide binder structure is then prepared in the following manner: A mixture of zinc oxide available from RCA under the tradename Florence Green Seal #8 is mixed in a 1/1 ratio by weight with SR-82 silicone resin available from General Electric Company. The resin is first dissolved in toluene and the zinc oxide then added. The dispersion is effected using a Branson Sonifer Model S 175. Enough solvent is added to yield a coating thickness of 0.4 to 0.7 mil when the coating is poured over the selectively masked aluminized Mylar substrate. The coated substrate is then dried for one hour at 50° C. The sheet is then dark rested for 12 hours.

EXAMPLE V

Using the method set forth in Example II, the structure prepared by the method of Example IV uniformly charged to a negative potential of about 100 volts, and a single frame exposed to about 10 foot-candle-seconds of light from a tungsten light source. After exposure, the frame is developed by uniformly exposing the entire sheet to vapors of carbon tetrachloride for about 10 seconds. An excellent copy of the original image is formed by this method.

Although specific components and proportions have been stated in the above description of the preferred embodiment of this invention, other suitable materials and procedures such as those listed above, may be used with similar results. In addition, other materials may be added which synergize, enhance or otherwise modify the method of imaging herein disclosed.

Other modifications and ramifications would appear to those skilled in the art upon reading the disclosure. These are intended to be within the scope of this invention.

What is claimed is:

1. In a method of imaging which comprises;

(a) providing an imaging structure having a support and an overlayer of softenable material containing particulate migration material;

(b) establishing an electrostatic latent image on at least a selected portion of said imaging structure; and (c) softening at least said selected portion of said softenable material whereby an image is formed by the selective migration in depth through said softenable material of said migration material in image configuration, the improvement which comprises repeating steps (b) and (c) at least once whereby at least one additional image is formed by the selective migration of migration material in image configuration and at least one of said additional images being superimposed at least partially within a prior migration image.

2. The method of claim 1 in which at least one of the additional images is formed adjacent to the original image formed in step (c).

3. The method of claim 1 wherein the method of softening said softenable material comprises contacting said material with vapors of a solvent for said softenable material.

4. The method of claim 1 wherein the method of softening comprises heating said softenable material.

5. The method of claim 1 wherein the migration material is photosensitive.

6. The method of claim 5 wherein the method of softening said softenable material comprises contacting said material with vapors of a solvent for said softenable material.

7. The method of claim 5 wherein the method of softening said imaging structure comprises heating said softenable material.

8. The method of claim 1 wherein the migration material is non-photoconductive.

9. The method of claim 8 wherein said electrostatic image is formed by the method of charging said imaging structure through a stencil.

References Cited

UNITED STATES PATENTS

| | | | |
|---|---|---|---|
| 1,416,706 | 5/1922 | Grass. | |
| 3,060,020 | 10/1962 | Greig | 96—1.2 |
| 3,253,913 | 5/1966 | Smith et al. | 96—1.2 |
| 3,275,439 | 9/1966 | Battison et al. | 96—41 |
| 3,343,142 | 9/1967 | Clark | 117—17.5 |
| 3,376,133 | 4/1968 | Roteman | 96—1.2 |
| 3,418,119 | 12/1968 | Schwartz et al. | 96—1X |

GEORGE F. LESMES, Primary Examiner

C. E. VAN HORN, Assistant Examiner

U.S. Cl. X.R.

117—17.5, 21; 96—27; 204—181